Nov. 21, 1961          H. A. LINGARD          3,009,425
TRUCK CONSTRUCTION FOR MODEL LOCOMOTIVE
Filed April 12, 1960          2 Sheets-Sheet 1
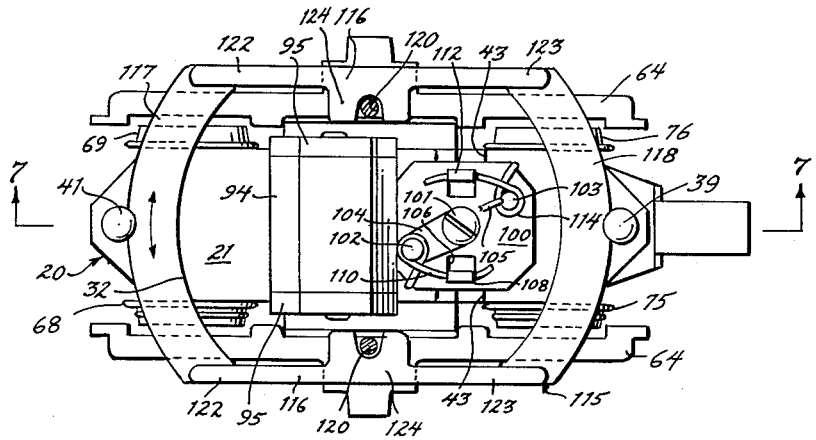
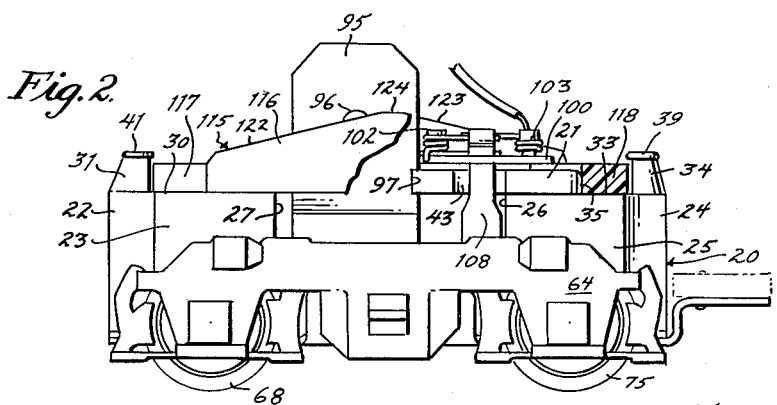
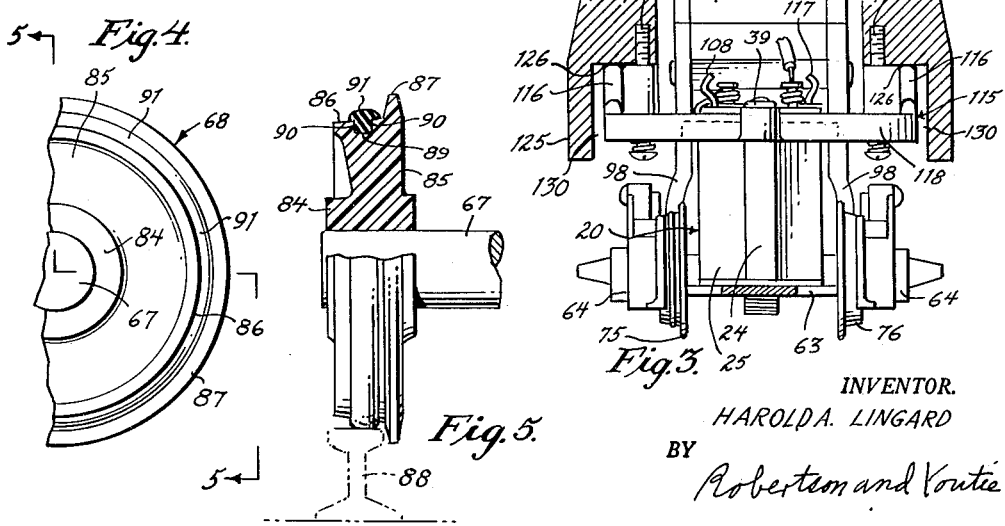
INVENTOR.
HAROLD A. LINGARD
BY
Robertson and Youtie
ATTORNEYS.

Nov. 21, 1961    H. A. LINGARD    3,009,425
TRUCK CONSTRUCTION FOR MODEL LOCOMOTIVE
Filed April 12, 1960    2 Sheets-Sheet 2
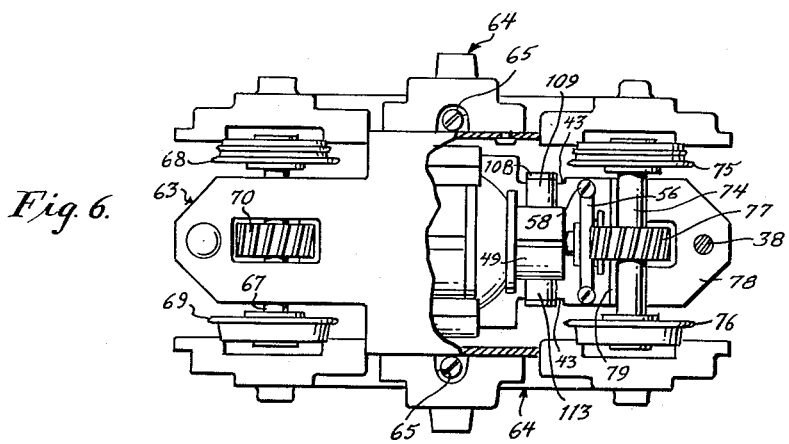
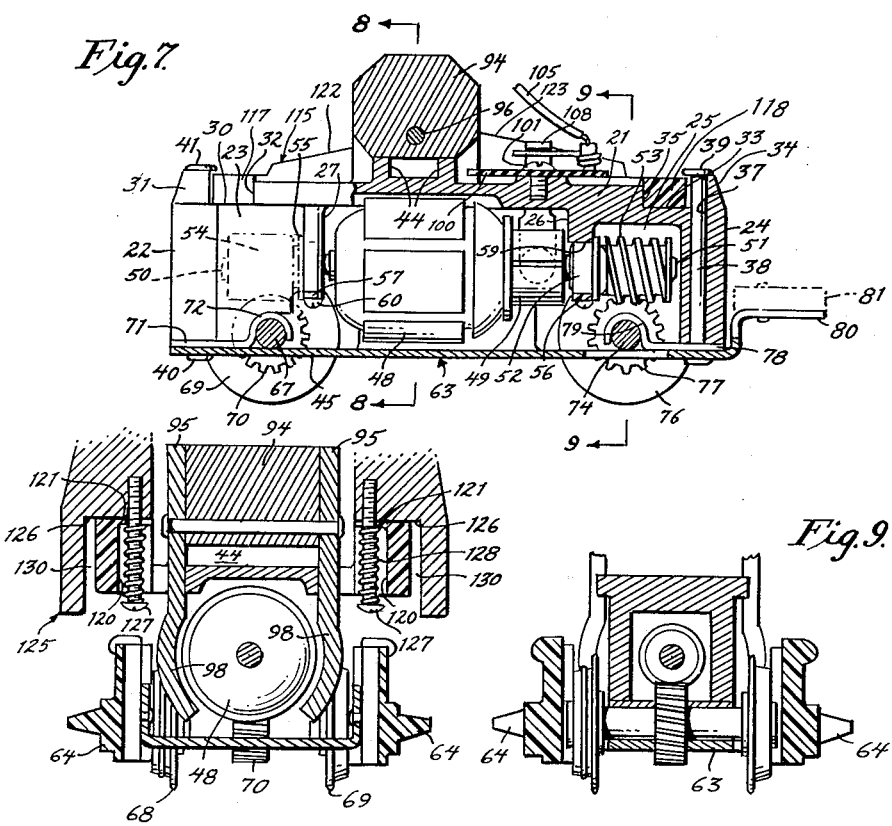
INVENTOR.
HAROLD A. LINGARD
BY Robertson and Voutie
ATTORNEYS.

3,009,425
TRUCK CONSTRUCTION FOR MODEL
LOCOMOTIVE
Harold A. Lingard, Merchantville, N.J., assignor to
Mantua Metal Products Co., Inc., Woodbury Heights,
N.J., a corporation of New Jersey
Filed Apr. 12, 1960, Ser. No. 21,737
10 Claims. (Cl. 105—49)

This invention relates generally to improvements in model electric trains, and is especially concerned with a unique truck construction for a model train.

It is one object of the present invention to provide a truck construction for a model train which insures contact of all the truck wheels with the rails at all times and under all operating conditions. This is especially important in a powered or driving truck as a prerequisite to efficient traction.

It is a further object of the present invention to provide a truck construction for model trains which includes a power unit or motor in power-transmitting relation with the truck wheels.

More specifically, the truck construction of the instant invention provides an extremely compact unit wherein the truck housing serves to house a motor armature which is directly connected to the driving wheels.

It is still another object of the present invention to provide a model-train truck construction having the advantageous characteristics mentioned in the preceding paragraphs, which occupies no greater space than a conventional scale model truck in HO trains. Hence, it is possible by employing the instant truck construction to provide a plurality of powered, driving trucks in a single HO scale model locomotive, to substantially increase the power thereof. Not only may an HO scale model locomotive be of greatly increased power by the provision of more than one powered truck, but also by the highly efficient utilization of power in its direct transmission from the motor to the driving wheels.

A more particular object of the present invention resides in the provision of a novel wheel construction which utilizes an elastic annulus to afford better traction of the wheels on the rails with a minimum of slippage.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a top plan view showing a truck for a model train constructed in accordance with the teachings of the present invention;

FIGURE 2 is a side elevational view showing the truck of FIGURE 1, partially broken away for purposes of clarity;

FIGURE 3 is a rear, end elevational view showing the truck of FIGURES 1 and 2;

FIGURE 4 is an enlarged, partial elevational view showing a wheel construction of the instant invention;

FIGURE 5 is a sectional elevational view taken substantially along the line 5—5 of FIGURE 4;

FIGURE 6 is a bottom plan view of the truck of FIGURES 1-3, with parts broken away to facilitate understanding;

FIGURE 7 is a longitudinal sectional view taken substantially along the line 7—7 of FIGURE 1;

FIGURE 8 is a transverse sectional view taken substantially along the line 8—8 of FIGURE 7; and FIGURE 9 is a transverse sectional view taken substantially along the line 9—9 of FIGURE 7.

Referring now more particularly to the drawings, the truck includes a generally longitudinally extending downwardly opening housing, generally designated 20, which is composed of a generally horizontal, longitudinally elongate top wall 21 having depending therefrom a front wall 22 and forward side-wall portions 23 extending a short distance rearward from the front wall 22 along opposite side edges of the top wall 21. Similarly, a rear wall 24 depends from the rear end of the top wall 21, as do rear side-wall portions 25 which extend forward from the rear wall 21 along opposite side edges of the top wall. The rear wall portions 25 each terminates at its forward edge 26 in alignment with and spaced from the rear edge 27 of the forward side-wall portion 23 on the same side of the top wall 21. In general, the housing 20 is approximately symmetrical about a longitudinal center line.

The top wall 21 of the housing 20 is provided adjacent to its front end with a laterally extending, upwardly facing recess 30 which is bounded on its forward side by an upstanding boss 31, and on its rearward side by a forwardly convex, arcuate side wall 32. Thus, the recess 30 defines a laterally extending open-ended passageway through the top housing wall 21. A similar laterally extending recess 33 is formed in the rearward region of the top wall 21, opening upward and laterally outward therefrom. On its rear side the recess 33 is bounded by an upstanding lug or boss 34, while on its forward side the recess 33 is bounded by a rearwardly convex, arcuate side wall 35. The front and rear walls 22 and 24 are each formed with a generally vertical, through bore, as at 37 in FIGURE 7. Through such bores extend fasteners or rivets, as at 38 having an enlarged head 39 on its upper end, seated on top of the boss 34 and partially overlying the recess 33. A similar fastener 40 extends vertically through the front wall 22 and has an enlarged head 41 on its upper end seated on top of the boss 31 and partially overlying the recess 30.

Just forward of the rear side-wall regions 25, the top wall 21 is provided on opposite sides with a pair of opposed, laterally outwardly facing cutouts or notches 43. Forward of the notches 43, but rearward of the front side-wall portions 23, the top wall 21 is formed with a pair of forwardly and rearwardly spaced, laterally extending, upstanding ribs or lands 44, best seen in FIGURE 7. The lower edges of the front side-wall regions 23, see FIGURE 7 may be stepped, as at 45; and, the lower edges of the rear sidewall regions 25 may also be stepped, if desired.

Interiorly of the housing 20 is located a motor armature 48, arranged approximately directly below the ribs 44 and extending longitudinally of the housing along the longitudinal center line thereof. The armature 48 includes a commutator 49 extending axially from one end of the rotary armature and rotatable therewith, the commutator underlying the portion of housing top wall 21 provided with cutouts 43. A front shaft 50 extends axially forward from the front end of the armature or rotor 48 and terminates short of the front end wall 22, while a rear shaft 51 extends axially rearward from the commutator 49 toward and terminating short of the rear end wall 24. The rear shaft 51 is provided with a bearing member or collar 52 rotatably circumposed about the shaft adjacent to the commutator 49, which serves as a journal bearing, as will appear presently. A worm gear 53 is circumposed about the rear end of the rear shaft 51, and keyed thereto for rotation therewith. A similar worm gear 54 is keyed to the forward end of the front shaft 50, and a similar journal bearing 55 is circumposed about the front shaft 50 between the worm gear 54 and armature 48.

Thus, the rotor 48, its shafts 50 and 51, and its gears 53 and 54 combine to define a rigid assembly extending longitudinally within the housing 20. The rotor assembly is rotatably mounted in the housing 20 for rotation about a longitudinal center line thereof by the journal bearings 52 and 55 which are secured to the housing by straps 56 and 57. That is, the rear strap 56 extends laterally across the underside of the rear bearing 52 and is secured at its opposite ends by fasteners 58 to the underside of the housing top wall 21 to clamp the bearing 52 upward against the underside of a conformably receiving surface 59 depending from the housing top wall. The front journal bearing 55 is similarly clamped by the strap 57 and its fasteners 60.

The bottom or underside of the housing 20 is closed by a generally horizontal, longitudinally extending bottom plate or retainer 63 which has its opposite ends secured to the housing at the front and rear housing walls 23 and 24 by the fasteners 40 and 38. Carried by and on opposite sides of the bottom retainer plate 63, and located outward of the housing 20, are a pair of simulated truck sidepieces 64. As best seen in FIGURE 6, the sidepieces 64 are each provided medially thereof with a vertical, through opening 65.

A front axle 67 extends laterally across and rests on a forward portion of the bottom plate 63 directly beneath the front worm gear 54 and carries on its opposite ends a pair of wheels 68 and 69. Medially the axle 67 carries a worm wheel 70 in meshing engagement with the worm gear 54. The axle 67 is rotatably held in position by a bearing member or plate 71 having its forward portion secured in sandwiched relation between the forward portion of the retainer plate 63 and the underside of the housing front wall 62 by the fastener 40. The bearing member or plate 71 includes a pair of rearwardly extending, laterally spaced legs 72 of a downwardly concave arcuate curvature conformably engaging over laterally spaced portions of the axle 67. Thus, the legs 72 of the bearing member 71 journal the axle 67 and provide bearing support therefor. The worm wheel 70 may project downward through the bottom plate 63, if desired.

A similar assembly is provided in the rearward region of the truck, including a laterally extending axle 74 resting on the bottom plate 63 and having fixed at its opposite ends a pair of wheels 75 and 76 on opposite sides of the bottom plate. A worm wheel 77 is fixedly circumposed about the axle 74 medially thereof in meshing engagement with the worm gear 53 and may project downward through the bottom plate. Rotatably securing the axle 64 in position is a bearing member or plate 78 having one portion secured in sandwiched relation between the rearward region of the bottom plate 63 and the underside of the rear housing wall 24 by the fastener 38. A pair of laterally spaced, forwardly extending legs 79 are provided on the bearing member 78 which are arcuately bent to conformably engage over and afford journal bearing to the axle 74. In addition, the bottom plate 63 may be provided with an upwardly offset rearward extension 80, rearward of the housing 20, and carrying a coupler 81 for attachment to an adjacent railroad car of any type.

The truck wheels 69 and 76 may be conventional and are preferably fabricated of electrically conductive material for carrying current between the armature 48 and one rail. However, the wheels 68 and 75, which engage with the other rail of a track are preferably of nonconductive material, such as plastic, and may be of identical construction, such as that best seen in FIGURES 4 and 5 wherein is shown in enlarged detail the wheel 68. The wheel 68 includes a central hub 84 fixedly circumposed about one end of the axle 67 and a circular body 85 extending radially outward from the hub 84 and formed with a circumferentially extending radially outwardly facing peripheral surface 86. Along the inner edge of the peripheral surface 86, extending circumferentially thereabout and radially outward therebeyond is a flange 87. A conventional track rail 88 is shown in supporting relation with the wheel 68 in FIGURE 5, the peripheral surface 86 being directly above the upper surface of the rail, and the flange 87 depending on the inner side of the rail.

Formed in the peripheral surface 86, medially between its outer edge and the flange 87 and extending circumferentially thereabout is an annular or endless, outwardly facing groove 89. The groove 89 is preferably of a polygonal cross-sectional configuration so as to have internal corners, being shown for purposes of illustration as generally rectangular in cross-sectional configuration and having internal corners 90. An elastic annulus or O-ring 91, which may be of generally circular cross-sectional configuration in its unstressed condition, is distended about the peripheral wheel surface 86 and snapped into engagement within the groove 89 extending entirely thereabout. The elastic annulus 91 may be of rubber or plastic and is in a distended condition when engaged within the groove 89. The groove 89 and the annulus 91 are proportioned so that the radially inner region of the annulus is snugly engaged in the groove and preferably by its own elasticity distorts into close conforming engagement within the groove corners 90. The radially outer region of the annulus 91 remains exteriorly of the groove 89 or radially outward of the surface 86 for frictional rolling engagement with the rail 88. By the above-described fitting relationship of the annulus 91 within the groove 89 little or no slippage occurs between the annulus and wheel. Also, the radially outer surface of the annulus 91 engages with the rail 88 over a relatively small area for increased unit pressure and resultant traction.

A permanent magnet 94, which may be of octagonal cross section, is seated on the lands or ribs 44 directly over the rotor 48 and extends laterally across the top wall 21. A pair of pole pieces or magnetic plates 95 are disposed adjacent to opposite ends of the laterally extending magnet 94, depending therefrom on opposite sides of the truck housing 20. More specifically, the pole pieces or plates 95 each has its upper portion disposed generally vertically and secured in facing abutting engagement with a respective end of the magnet 94, as by a fastener 96 extending through the magnet and both pole pieces. The magnetic pole pieces or plates 95 are each notched, as at 97 in FIGURE 2 for interfitting engagement with the adjacent side edge of the housing top wall 21, to secure the assembled magnet 94 and pole pieces rigidly to the housing. The pole pieces 95 depend below the housing top wall 21 on opposite sides of the armature 48, and are there curved, as at 98, concavely inward in conformably spaced relation with the armature. This construction is best seen in FIGURE 8.

A generally horizontal insulating card or sheet 100 is superposed on the housing top wall 21 just rearward of the magnet 94 between the notches 43. The insulating sheet or card 100 is secured to the housing top wall 21 by a conductive fastener 101 extending downward through and in threaded engagement into the housing top wall. A pair of terminal posts 102 and 103 are fixed to the insulating card 100, as at diagonally opposed corners thereof. The terminal post 102 is connected by a conductor strip 104 with the metallic fastener 101, and thus electrically connected to the housing, while the terminal post 103 is insulated from the housing by the card 100 and provided with a wire or lead 105. The insulating card 100 is formed with a pair of laterally spaced through openings 106 and 107 on opposite sides of the central fastener 101 and respectively located over the notches or cutouts 43 of the housing top wall 21. A commutator brush 108 includes a strip extending generally vertically upward through the insulating-card opening 106, and a contact 109 on its lower end engaging with the commutator 49. A resilient coil or spring 110 of electrically conductive material is circumposed about the terminals 102, having one leg restrained by engagement with an edge of the card 100, and having its other leg or end in bearing engagement with the upper end of the strip 108. Thus, the upper end of the strip 108 is resiliently urged laterally outward against the laterally outer edge of its receiving opening 106, to resiliently maintain the contact 109 in engagement with the commutator 49, to provide electrical connection between the terminal post 102 and the commutator.

Similarly, a commutator brush on the other side of the commutator includes a generally vertically disposed conductive strip extending through the card opening 107 and having on its lower end a contact 113 engageable with the commutator. A conductive resilient wire or spring 114 is secured to and extends about the terminal post 103, having one end or leg retained by engagement with an edge of the insulator card 100, and having its other leg or end in yieldable bearing engagement with the upper end of strip 112 to urge the contact 113 against the commutator 49. It is now understood that electric current may pass from one rail through the wheels 69 and 76, to the housing 20, thence through the strip 104, terminal post 102, spring 110 and commutator brush 108 to the commutator 49. From the commutator 49 the current may pass to the brush 112 and through the spring 114 to the post 103 and conductor or wire 105 to another truck for return to the other rail.

A generally open frame or yoke 115 includes a pair of laterally spaced, longitudinally extending sidepieces on opposite sides of the housing 120, and a pair of generally laterally extending, longitudinally spaced endpieces 117 and 118 extending respectively between the rearward and forward ends of the sidepieces. The endpieces 117 and 118 are of arcuate configuration, the front endpiece 117 being freely slidably received in the recess or passageway 30 of the housing top wall 21, and the rear endpiece 118 being freely slidably received in the rear topwall recess or passageway 33. Further, the forward endpiece 117 is of an arcuate configuration, being forwardly convex and of a curvature substantially equal to that of the passageway wall 32. Similarly, the rear endpiece 118 is convex rearwardly and of a curvature substantially equal to that of the passageway wall 35. The frame or yoke 115 has its endpieces 117 and 118 loosely or freely slidably received in and extending laterally through beyond the passageway 30 and 33, respectively, being located beneath and retained by the enlarged upper ends or heads 41 and 39 of fasteners 40 and 38. In this condition, the open frame or yoke 115 is rotatable relative to the housing 20 about a generally vertical axis; and, as only the fastener enlargements 41 and 39 overlie the yoke at a small region along the center line of the housing 20, the yoke is able to be tilted or canted relative to the housing about a longitudinal center line thereof.

The longitudinal sidepieces 116 of the yoke 115 are each formed medially of its length with a generally vertical through opening 120. As seen in FIGURE 8, the openings 120 are each provided with an internal shoulder 121 at its upper end which reduces or constricts the respective opening.

It will also be noted that the sidepieces 116, see FIGURE 2, are each configured to taper upward toward the central region formed with the hole or opening 120. That is, the sidepieces 116 extend upward beyond the endpieces 117 and 118, and is each formed with a forward upper-edge region 122 extending rearward and upward toward the opening 120, and a rearward upper-edge region 123 extending forward and upward toward the opening 120. Thus, the upper-edge regions 122 and 123 of each sidepiece 116 are upwardly convergent toward the medial region of the sidepiece. Further, the upwardly convergent upper-edge regions of each sidepiece 116 terminate in a generally horizontal medial upper-edge region 124 surrounding the upper end of the respective opening 120.

In assembly of a truck of the instant invention with the body of a locomotive or other car, the upper region of the truck, including the top housing wall 21 and the magnet 94 are received upward in the car body 125, and the medial upper-edge regions 124 of the yoke sidepieces 116 are in bearing engagement with laterally opposed downwardly facing surfaces 126 of the car body. A fastener 127, such as a headed screw, is extended upward in spaced relation through each of the yoke sidepiece openings 120, through the body surface 126 and in threaded engagement into the body 125. A suitable resiliently yieldable means, such as a coil compression spring 128 is circumposed about each of the headed fasteners 127 within the respective yoke opening 120; and, the coil compression springs 128 each has its upper end in bearing engagement with the shoulder or constriction 121 of the respective opening 120 and its lower end in bearing engagement with the head of the received fastener. Thus, by this construction the yoke 115 is connected to the body 125 and the generally horizontal upper surface 124 of the yoke sidepieces 116 is resiliently urged into bearing engagement with the downwardly facing surfaces 126 of the car body. By reason of the resilient compressibility or yieldability of the springs 128, and the spaced reception of the fasteners 127 in the openings 120, the yoke 115 is rockable relative to the body 125 to selectively swing its upper surfaces 122 toward the body surfaces 126, or to swing its upper surfaces 123 toward the body surfaces 126. It will be apparent that this rockability or canting takes place about a laterally extending axis approximately through the yoke openings 120.

Also, the yoke 115 is rockable about a longitudinal center line by reason of the resilient yieldability of the springs 128 and the laterally spaced reception of the yoke within the body 125 to afford the clearances 130. This lateral rockability of canting of the yoke 115 is additive to the lateral canting or rocking of the housing 120 relative to the yoke, described hereinbefore.

It will now be appreciated that the several degrees of tilting or rocking action afforded the housing 20 relative to the body 125 insure full four-wheel engagement of the truck with the track at all times, for improved electrical operating characteristics, as well as increased power and traction.

From the foregoing it is seen that the present invention provides a truck construction for a model railroad train which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:
1. In a model train, a truck comprising a housing, rollable wheels journaled in said housing, motive means in said housing for driving said wheels, said housing being provided with a pair of forwardly and rearwardly spaced laterally extending open-ended passageways, and a mounting member having forwardly and rearwardly spaced portions respectively slidable in said passageways for rotary oscilllation relative to said housing, and securing means for securing said mounting member to a train body to mount said housing and wheels for simultaneous rotary oscillation relative to a train body.
2. A model train according to claim 1, said mounting member comprising an open frame, and said forwardly and rearwardly spaced portions being defined by arcuate end pieces of said frame.

3. A model train according to claim 2, said securing means comprising a fastener extending loosely through said frame on each side of said housing for engagement in a train body, and resilient means carried by said fastener and in engagement with said frame to resiliently urge the latter against said train body and afford said frame rocking movement relative to said train body against the force of said resilient means, whereby said housing and wheels are rockable with said frame relative to said train body.

4. A model train according to claim 1, said rollable wheels comprising forward and rearward spaced pairs of wheels journaled in said housing for rotation about laterally extending axes, and said motive means comprising an electric motor carried by said housing medially between said laterally extending axes and rotatable about a longitudinally extending axis, and drive means interconnected between said motor and at least one of said pairs of wheels.

5. A model train according to claim 4, said drive means comprising a shaft extending from said motor, an axle rotatably carrying one pair of wheels, and intermeshing gearing on said shaft and axle.

6. A model train according to claim 1, one of said wheels being formed with a circumferentially extending radially outwardly opening groove of generally polygonal cross-sectional configuration located medially of the peripheral wheel surface, and an elastic annulus extending circumferentially about and having its radially inner region received in said groove with its radially outer region exteriorly of said groove for frictional engagement with a track, said annulus being engaged in a corner of said groove for increased resistance to slippage without adhesion between said annulus and said one wheel.

7. In a model train, the combination comprising a longitudinally extending truck housing, forward and rearward pairs of wheels journaled in said housing for rotation about laterally extending axes, said housing being provided with a pair of forwardly and rearwardly spaced passageways each opening laterally outward on opposite sides of said housing, an open yoke having arcuate forward and rearward pieces respectively loosely slidably received in said forward and rearward passageways and having longitudinally extending side pieces on opposite sides of said housing, said housing and yoke being relatively rotatable about a generally vertical axis, said passageways opening upward from said housing except for a limited region along the center line of said housing to permit lateral canting of said housing relative to said yoke, and securing means for securing said yoke to a train body to mount said housing and wheels for simultaneous rotary oscillation and canting relative to a train body.

8. A model train according to claim 7, said securing means comprising a fastener extending spacedly through each side piece of said yoke medially thereof for engagement in a train body, and resilient means carried by each of said fasteners in resiliently yieldable engagement with said yoke to urge the latter against said train body and afford rocking movement to said yoke relative to said train body against the force of said resilient means, whereby said housing and wheels are rockable with said yoke relative to said train body.

9. A model train according to claim 8, in combination with an electric motor carried within said housing spaced intermediate said pairs of wheels and mounted for rotation about an axis extending longitudinally of said housing, intermeshing gearing operatively connecting said motor and at least one pair of said wheels, at least one wheel of said one pair being formed with a circumferentially extending radially outwardly opening groove of generally polygonal cross section, and an elastic annulus extending circumferentially about and having its radially inner region received in said groove with its radially outer region exteriorly of said groove for frictional engagement with a track, said annulus being engaged in a corner of said groove for increased resistance to slippage without adhesion between said annulus and said one wheel.

10. A model train according to claim 9, said elastic annulus comprising an O-ring of a width less than that of a track.

References Cited in the file of this patent

UNITED STATES PATENTS

| | | |
|---|---|---|
| 2,518,853 | Applegate | Aug. 15, 1950 |
| 2,595,936 | Goode | May 6, 1952 |
| 2,814,257 | Joyce | Nov. 26, 1957 |
| 2,897,770 | Bonanno | Aug. 4, 1959 |